Oct. 13, 1936.    W. G. BALZ    2,057,178
FISHING REEL
Filed Sept. 11, 1935
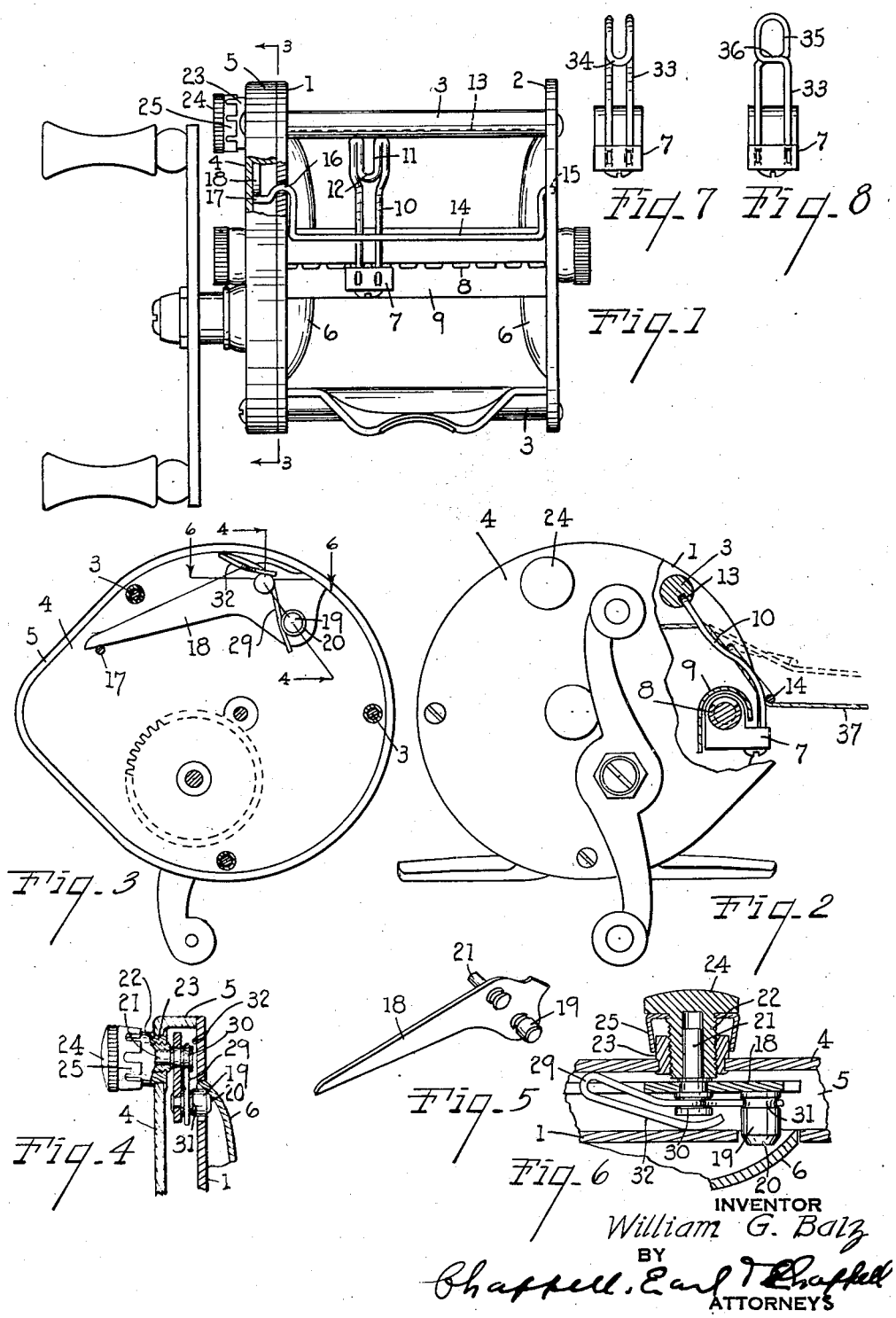

Patented Oct. 13, 1936

2,057,178

UNITED STATES PATENT OFFICE 2,057,178

FISHING REEL

William G. Balz, Kalamazoo, Mich., assignor to Shakespeare Company, Kalamazoo, Mich.

Application September 11, 1935, Serial No. 40,065

14 Claims. (Cl. 242—84.5)

The main objects of this invention are:

First, to provide an anti-back lash reel which is positive and sensitive in its operation.

Second, to provide in a level wind reel an improved line guide eye particularly adapted for cooperation with an anti-back lash mechanism.

Third, to provide an anti-back lash reel which can be quickly and easily adjusted to regulate the braking action or to entirely release the anti-back lash mechanism.

Fourth, to provide a mechanism having these advantages which is very economical in its parts and the assembly thereof.

Objects relating to details and economies of my invention will appear from the description to follow. The invention is defined and pointed out in the claims.

A structure which is a preferred embodiment of my invention is illustrated in the accompanying drawing, in which:

Fig. 1 is a front view of a fishing reel embodying the features of my invention, a portion of the frame being broken away to illustrate the arrangement of parts.

Fig. 2 is an end elevation looking from the left of Fig. 1 with parts broken away and sectioned.

Fig. 3 is a detail section on a line corresponding to line 3—3 of Fig. 1.

Fig. 4 is a fragmentary view mainly in section on line 4—4 of Fig. 3.

Fig. 5 is a perspective view of the brake, brake lever and its pivot.

Fig. 6 is a detail section on a line corresponding to line 6—6 of Fig. 3.

Figs. 7 and 8 are front elevations of the line guide carriage showing modifications of the line guide eye.

The embodiment of my invention illustrated comprises a frame consisting of head and tail end members 1 and 2 connected by suitable pillars 3. The head plate 4 is provided with a peripheral flange 5 and this cooperates with the end member 1 to provide a housing for the gearing and brake mechanism. The spool is provided with dished flanges 6.

The level wind or line guide carriage 7 is driven from the reversely threaded traversing shaft 8, a housing 9 being provided for the shaft and the carriage.

The traversing line guide 10 is formed of a loop of wire, the arms of which are secured to the carriage, the bight end of the loop of wire being inwardly offset to provide a line guide eye 11, the line commonly riding on the cross portion 12 at the bottom of the eye. One of the pillars is provided with a longitudinal groove 13 receiving the end of the line guide.

The anti-back lash mechanism comprises the bail-shaped line actuated member 14 pivoted at 15 and 16 in the end members of the frame and having a crank 17 which engages the brake lever 18. This brake lever carries a stud-like or cylindrical brake shoe 19 which projects into the dished flange of the spool to coact with the interior thereof. The end of the brake shoe is preferably of conical form or beveled at 20. This brake lever is mounted on a pivot 21, the pivot being carried by the support 22 threaded into a bushing 23 provided therefor in the head or housing plate 4. This support member is provided with a knurled finger piece 24 at its outer end and with spring fingers 25 embracing the bushing to frictionally hold the support in its adjusted position.

It will be noted that the brake lever and consequently the brake shoe may be moved in or out by the manipulation of this support either to regulate the amount of braking action or to entirely disengage or render the brake entirely inoperative and thus render the anti-back lash mechanism inoperative.

The brake is resiliently urged to engaging position by means of the spring 29 which is fulcrumed on the lever pivot and has one arm engaged with the brake shoe, the pivot pin and brake shoe having grooves 30 and 31 respectively for receiving and retaining the spring. The other arm of the spring engages both the inner side and the peripheral flange of the housing member so as to maintain the spring in its assembled relation and to hold it under tension.

The housing engaging arm of the spring has a return bent arm 32 which bears against the head end member 1 so that the spring also serves to urge the brake supporting pivot towards its support and when the support is backed off or manipulated to move it outwardly, the spring will force the pivot along with it.

With this very simple arrangement of parts, I provide a very effective anti-back lash mechanism which is highly sensitive and can be easily and accurately adjusted to secure the desired braking action or to render the anti-back lash mechanism entirely inoperative.

In Fig. 7, I illustrate a modified form of line guide eye 33, the bight end 34 of the loop forming the eye being bent laterally downward instead of being downwardly offset between the arms as shown in Fig. 1.

In the embodiment shown in Fig. 8, the line guide eye 35 has its loop portion given a half twist which provides an eye at its upper end and bearing or cross portions 36 corresponding to the bearing or line supporting portions 12 of the embodiment shown in Fig. 1. By thus guiding the line, a substantial leverage is provided for the line on the line actuated member 14 as it will be noted as shown in Fig. 2 that the line indicated at 37 is passed through the eye and thence downwardly under the line actuated member 14 so that a tension such as results in a cast will release the brake, the parts being shown in their released position by dotted lines in Fig. 2.

The operation of anti-back lash reels is well understood and therefore is not further described herein.

I have illustrated and described my improvements in an embodiment which I have found highly satisfactory. I have not attempted to illustrate other embodiments or adaptations which I contemplate as it is believed that this disclosure will enable those skilled in the art to embody or adapt my improvements as may be desired.

Having thus described my invention, what I claim as new and desire to secure by Letters Patent, is:

1. In a fishing reel, the combination with a frame comprising head and tail end members, a flanged housing plate associated with said head end member, a spool having a dished flange journaled in said frame, a brake lever provided with a brake shoe coacting with the inner side of said spool flange adjacent the periphery thereof, a pivot for said lever, a support for said lever pivot mounted for adjustment on said head end member, a spring fulcrumed on said lever pivot with one end in engagement with said brake shoe and the other in engagement with the side and flange of the housing plate, such end being provided with a return bent arm engaging the head end member whereby the spring is retained in position and acts to tension the brake and to yieldingly hold the brake lever pivot in its support, and a bail-shaped line actuated member mounted on said end members and provided with a crank arm coacting with said brake lever.

2. In a fishing reel, the combination with a frame comprising head and tail end members, a flanged housing plate associated with said head end member, a spool having a dished flange journaled in said frame, a brake lever provided with a brake shoe coacting with the inner side of said spool flange adjacent the periphery thereof, a pivot for said lever, a support for said lever pivot mounted for adjustment on said head end member, a spring fulcrumed on said lever pivot with one end in engagement with said brake shoe and the other in engagement with the side and flange of the housing plate, such end being provided with a return bent arm engaging the head end member whereby the spring is retained in position and acts to tension the brake and to yieldingly hold the brake lever pivot in its support, and a line actuated member operatively associated with said brake lever.

3. In a fishing reel, the combination with a frame comprising head and tail end members, a flanged housing plate associated with said head end member, a spool having a dished flange journaled in said frame, a brake lever provided with a laterally projecting brake shoe having a tapered end coacting with the inner side of said spool flange adjacent the periphery thereof, a pivot for said lever, a support for said lever pivot mounted for threaded adjustment on said head end member and provided with a finger piece at its outer end, a spring fulcrumed on said lever pivot with one end in engagement with said brake shoe and the other in engagement with the side and flange of the housing plate, such end being provided with a return bent arm engaging the head end member, the brake shoe and lever pivot being grooved to receive said spring whereby the spring is retained in position and acts to tension the brake and to yieldingly hold the brake lever pivot in its support, and a line actuated member operatively associated with said brake lever.

4. In a fishing reel, the combination with a frame comprising head and tail end members, a flanged housing plate associated with said head end member, a spool having a dished flange journaled in said frame, a brake lever provided with a brake shoe coacting with the inner side of said spool flange adjacent the periphery thereof, a pivot for said lever, a support for said lever pivot mounted for adjustment on said head end member and provided with a finger piece at the outer side of the head, a spring fulcrumed on said lever pivot with one end in engagement with said brake shoe and the other in engagement with the head end member and side and flange of the housing plate, and a bail-shaped line actuated member mounted on said end members and provided with a crank arm coacting with said brake lever.

5. In a fishing reel, the combination with a frame comprising head and tail end members, a flanged housing plate associated with said head end member, a spool having a dished flange journaled in said frame, a brake lever provided with a brake shoe coacting with the inner side of said spool flange adjacent the periphery thereof, a pivot for said lever, a spring fulcrumed on said lever pivot with one end in engagement with said brake shoe and the other in engagement with the head end member and side and flange of the housing plate, and a line actuated member operatively associated with said brake lever.

6. In a fishing reel, the combination with a frame comprising head and tail end members, a flanged housing plate associated with said head end member, a spool having a dished flange journaled in said frame, a brake lever provided with a laterally projecting brake shoe having a tapered end coacting with the inner side of said spool flange adjacent the periphery thereof, a pivot for said lever, a spring fulcrumed on said lever pivot with one end in tensioning engagement with said brake shoe and the other in engagement with the inner side of the housing plate and head member, and a line actuated member operatively associated with said brake lever.

7. In a fishing reel, the combination with a frame comprising a chambered head, a spool having a dished flange journaled in said frame, a brake lever provided with a brake shoe coacting with the inner side of said spool flange, a pivot for said lever, a support for said lever pivot mounted for adjustment on said head and provided with a finger piece at the outer side of the head, a spring fulcrumed on said lever pivot with one end in engagement with said brake shoe and the other in engagement with a relatively fixed part, such end being provided with a return bent arm engaging a relatively fixed part whereby the spring is retained in position and acts to tension the brake and to yieldingly hold the brake lever pivot in its said support, and a line actuated member mounted on said frame and operatively associated with said brake lever.

8. In a fishing reel, the combination with a frame comprising a chambered head, a spool having a dished flange journaled in said frame, a brake lever provided with a brake shoe coacting with the inner side of said spool flange, a pivot for said lever, a spring fulcrumed on said lever pivot with one end in engagement with said brake shoe and the other in engagement with a relatively fixed part, such end being provided with a return bent arm engaging a relatively fixed part, and a line actuated member mounted on said frame and operatively associated with said brake lever.

9. In an anti-back lash reel, the combination of a flanged spool, a spring urged brake lever, a brake shoe on said lever coacting with a spool flange to retard the spool, line actuated means operatively associated with said brake lever whereby the brake is moved out of braking contact with said spool when the line is under tension, and a line guide having a transverse line bearing portion adapted to guide the line and maintain its contact with said line actuated member.

10. In an anti-back lash reel, the combination with a spool, of a traversing carriage provided with a line guide eye formed of a loop of wire, the bight portion of the loop being downwardly offset to provide a line receiving eye, a brake operatively associated with said spool, and a bail-shaped line actuated member disposed in front of said line guide eye with its cross portion below the line receiving portion thereof.

11. In an anti-back lash reel, the combination with a spool, of a traversing carriage provided with a line guide eye formed of a loop of wire, the bight portion of the loop being downwardly offset to provide a line receiving eye, a brake operatively associated with said spool, and a line actuated member disposed in front of and below said line guide eye.

12. In a fishing reel, the combination with a spool, a line traversing carriage, a line guide eye on said carriage formed of a wire loop having its bight end downwardly offset to provide a line receiving eye, and a frame member grooved to receive the outer end of the line guide eye.

13. In a fishing reel, the combination with a spool, a line traversing carriage, and a line guide eye on said carriage formed of a wire loop having its bight end downwardly offset to provide a line receiving eye.

14. In a fishing reel, the combination with a frame, a spool, a line traversing carriage, and a line guide eye on said line traversing carriage formed of a loop of wire, the arms of which are secured to the carriage, the bight end of the loop of wire being offset to provide a line receiving opening.

WILLIAM G. BALZ.